United States Patent
Kollmann et al.

(10) Patent No.: US 8,181,161 B2
(45) Date of Patent: *May 15, 2012

(54) SYSTEM FOR AUTOMATICALLY COLLECTING TRACE DETAIL AND HISTORY DATA

(75) Inventors: Michael Dieter Kollmann, Ontario (CA); Daniel Alan Rose, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 863 days.

This patent is subject to a terminal disclaimer.

(21) Appl. No.: 12/262,194

(22) Filed: Oct. 31, 2008

(65) Prior Publication Data

US 2009/0119548 A1    May 7, 2009

Related U.S. Application Data

(63) Continuation of application No. 10/615,323, filed on Jul. 7, 2003, now Pat. No. 7,506,314.

(51) Int. Cl.
*G06F 9/44* (2006.01)
*G06F 11/00* (2006.01)
(52) U.S. Cl. .......................... 717/128; 714/45
(58) Field of Classification Search .................. None
See application file for complete search history.

(56) References Cited

U.S. PATENT DOCUMENTS

| | | | |
|---|---|---|---|
| 5,642,478 A * | 6/1997 | Chen et al. ................ | 714/45 |
| 5,862,316 A * | 1/1999 | Hagersten et al. .......... | 714/15 |
| 5,889,784 A | 3/1999 | Rogers .................... | 371/5.1 |
| 6,083,281 A * | 7/2000 | Diec et al. ................ | 717/128 |
| 6,453,356 B1 | 9/2002 | Sheard et al. .............. | 709/231 |
| 6,513,155 B1 * | 1/2003 | Alexander et al. .......... | 717/124 |
| 6,539,500 B1 * | 3/2003 | Kahle et al. ............... | 714/45 |
| 6,539,501 B1 * | 3/2003 | Edwards .................. | 714/45 |
| 6,615,370 B1 * | 9/2003 | Edwards et al. ............ | 714/45 |
| 6,658,416 B1 * | 12/2003 | Hussain et al. ............ | 1/1 |
| 6,665,821 B1 * | 12/2003 | Miyayama et al. ......... | 714/45 |
| 6,678,883 B1 * | 1/2004 | Berry et al. ............... | 717/128 |

(Continued)

FOREIGN PATENT DOCUMENTS

CA    2381737    10/2003

(Continued)

OTHER PUBLICATIONS

Randy H. Katz; Trace scheduling, Conditional Execution, Speculation, Limits of ILP [online]; 1996 [retrieved on Jan. 9, 2012]; pp. 1-21. Retrieved from Internet: <URL: http://bnrg.cs.berkeley.edu/~randy/Courses/CS252.S96/Lecture13.pdf>.*

(Continued)

*Primary Examiner* — Thuy Dao
*Assistant Examiner* — Hanh T Bui
(74) *Attorney, Agent, or Firm* — Samuel K. Simpson; Patent Ingenuity, P.C.

(57) ABSTRACT

A tracing mechanism operates at a low level of detail during normal program execution and automatically provides an increased level of detail during exception situations. The tracing mechanism also discloses history information prior to the exception situation. Program activity trace data is used to control action of the configurable trace facility allowing history data of a program's activity to be combined with current trace data into a persistent log. The trace facility may also be configured to recognize specified trigger values from either hardware or software means.

20 Claims, 2 Drawing Sheets

U.S. PATENT DOCUMENTS

| | | | |
|---|---|---|---|
| 6,766,511 B1 * | 7/2004 | Berry et al. ............... | 717/128 |
| 6,910,160 B2 * | 6/2005 | Bajoria et al. ............. | 714/45 |
| 6,918,065 B1 * | 7/2005 | Edwards et al. ............ | 714/45 |
| 6,922,795 B2 * | 7/2005 | Miyayama et al. .......... | 714/34 |
| 6,961,872 B2 * | 11/2005 | Yamamoto et al. .......... | 714/34 |
| 6,988,263 B1 * | 1/2006 | Hussain et al. ............. | 717/128 |
| 7,055,070 B1 * | 5/2006 | Uhler et al. ................. | 714/45 |
| 7,058,928 B2 * | 6/2006 | Wygodny et al. ........... | 717/128 |
| 7,107,585 B2 * | 9/2006 | Berent et al. ............... | 717/154 |
| 7,216,276 B1 * | 5/2007 | Azimi et al. ................ | 714/733 |
| 7,260,692 B1 * | 8/2007 | Zahavi et al. ............... | 711/154 |
| 7,330,809 B2 * | 2/2008 | Tabe ........................... | 703/23 |
| 7,506,314 B2 * | 3/2009 | Kollmann et al. ........... | 717/128 |
| 7,577,878 B2 * | 8/2009 | Baradie et al. .............. | 714/45 |
| 7,600,221 B1 * | 10/2009 | Rangachari ................. | 717/128 |
| 7,941,789 B2 * | 5/2011 | Ivanov et al. ............... | 717/128 |
| 7,979,850 B2 * | 7/2011 | Ivanov et al. ............... | 717/128 |
| 8,028,200 B2 * | 9/2011 | Ivanov et al. ............... | 714/45 |
| 8,037,457 B2 * | 10/2011 | Stefanov ..................... | 717/128 |
| 8,037,458 B2 * | 10/2011 | Shekov ....................... | 717/128 |
| 2002/0198983 A1 | 12/2002 | Ullmann et al. ............ | 709/224 |
| 2005/0223364 A1 * | 10/2005 | Peri et al. ................... | 717/128 |
| 2006/0129999 A1 * | 6/2006 | Hiraoka et al. .............. | 717/128 |
| 2008/0098359 A1 * | 4/2008 | Ivanov et al. ............... | 717/128 |
| 2008/0115115 A1 * | 5/2008 | Codrescu et al. ........... | 717/128 |
| 2008/0127108 A1 * | 5/2008 | Ivanov et al. ............... | 717/128 |
| 2008/0127109 A1 * | 5/2008 | Simeon ....................... | 717/128 |
| 2008/0127110 A1 * | 5/2008 | Ivanov et al. ............... | 717/128 |
| 2009/0113398 A1 * | 4/2009 | Birkill et al. ................ | 717/128 |
| 2009/0204949 A1 * | 8/2009 | Howland et al. ............ | 717/128 |

FOREIGN PATENT DOCUMENTS

JP          59209821          5/1986

OTHER PUBLICATIONS

Michele Co et al.; Evaluating Trace Cache Energy Efficiency [online]; Dec. 2006 [retrieved on Jan. 9, 2012]; pp. 450-476. Retrieved from the Internet: <URL: http://delivery.acm.org/10.1145/1190000/1187980/p450-co.pdf?>.*

"Error message with unique identifiers," Research Disclosure, Jun. 2001/1091.

"Product Review Insure ++," available at URL:http://www.parasoft.com/, Jun. 27, 2003.

"Using Codewords to Protect Database Data from a Class of Software Errors," Philip Bohannon et al., 15th International Conference on Data Engineering, Mar. 23-26, 1999, Sydney, Australia.

Margaret Martonosi et al. "Effectiveness of Trace Sampling for Performance Debugging Tools," 1993 ACM Sigmetrics-5/93/CA, USA.

Jennifer Anderson et al. "Continuous Profiling: Where Have All the Cycles Gone?" ACM Transactions on Computer Systems, vol. 15, No. 4, Nov. 1997, pp. 357-390.

Brian Marick. The Trace.Java User's Guide, http://www.visibleworkings.com/trace/Documentation/Trace.html, 2000.

U.S. Appl. No. 10/615,323, Kollmann et al., Method for Automatically Collecting Trace Detail and History Data, filed Jul. 7, 2003.

Canadian Serial No. 2,433,740, Kollmann et al., Automatic Collection of Trace Detail and History Data, filed Jun. 27, 2003.

* cited by examiner

SYSTEM FOR AUTOMATICALLY COLLECTING TRACE DETAIL AND HISTORY DATA

PRIORITY CLAIM

The present application is a continuation of U.S. patent application Ser. No. 10/615,323, filed on Jul. 7, 2003, entitled "Method for Automatically Collecting Trace Detail and History Data," issued on Mar. 17, 2009 as U.S. Pat. No. 7,506,314, which claimed the priority of Canadian patent application, Serial No. 2,433,740, titled "Automatic Collection of Trace Detail and History Data," which was filed on Jun. 27, 2003, both of which are incorporated herein by reference.

FIELD OF THE INVENTION

This present invention relates generally to collecting program activity data in a computer system and more particularly to automatically collecting trace detail and history data of program activity in a computer system.

BACKGROUND OF THE INVENTION

In general most software has a mechanism for logging or tracing program activity during execution of a software application. These logs or traces typically capture differing types of errors and general program execution flow data. The logging or tracing facility usually provides a capability to select from among multiple levels of tracing. A tracing level may be set to a low level to reduce the amount of resource required (for example, I/O, storage and processor) during normal operation mode and alternatively to a high level during problem determination mode.

Typically, errors occur during program execution when logging or trace levels are set low as this is the normal mode of operation. In a typical manner when an error condition occurs, the trace level needs to be raised and the problem recreated to produce more detailed data under the higher level tracing conditions. Having to change the tracing level as well as recreate the problem causes an increase in time required to diagnose a problem. In many cases the problem may not be easily recreated further impeding the problem diagnosis. There is therefore a need to provide a tracing facility that provides detailed information regarding error conditions without placing an undue burden on the normal operating environment of a program. The need for such a system has heretofore remained unsatisfied.

SUMMARY OF THE INVENTION

The present invention satisfies this need, and presents a system, a computer program product, and an associated method (collectively referred to herein as "the system" or "the present system") for providing a tracing mechanism to operate at a low level of detail during normal program execution and to automatically provide an increased level of detail during exception situations. This increased level of detail is provided in conjunction with history information prior to the exception situation. Program activity trace data is used to control action of the configurable trace facility allowing history data of a program's activity to be combined with current trace data into a persistent log. The trace facility may also be configured to recognize specified trigger values from either hardware or software means.

In another embodiment of the present invention, there is provided a computer system for automatic collection of trace detail and history data of program activity in the computer system. The computer system comprises means for tracing program activity at a first level to produce trace detail data, and means for writing trace detail data to a trace buffer; and means for determining that the first level does not exceed a first predetermined value and continuing to trace at said first level, otherwise writing the trace buffer to a log. Further, the computer system comprises means for determining that the first level is equal to a second predetermined value and writing the trace buffer to the log, otherwise determining that the first level does not exceed a third predetermined value and continuing to trace at the first level, otherwise writing the trace buffer to the log.

In another embodiment of the present invention, there is provided a computer program product having a computer readable medium tangibly embodying computer readable program code for instructing a computer to perform a method for automatic collection of trace detail and history data of program activity in a computer system. The method comprises the following steps: tracing program activity at a first level to produce trace detail data, writing trace detail data to a trace buffer, determining that the first level does not exceed a first predetermined value, continuing to trace at the first level, otherwise writing the trace buffer to a log; and determining that the first level is equal to a second predetermined value, writing the trace buffer to said log, otherwise determining that the first level does not exceed a third predetermined value, continuing to trace at the first level, otherwise writing the trace buffer to the log.

In another embodiment of the present invention, there is provided a computer program product having a computer readable medium tangibly embodying computer readable program code for instructing a computer to provide the means of a computer system for automatic collection of trace detail and history data of program activity in the computer system. The computer system comprises means for tracing program activity at a first level to produce trace detail data, and means for writing the trace detail data to a trace buffer; and means for determining that the first level does not exceed a first predetermined value and continuing to trace at the first level, otherwise writing the trace buffer to a log; and means for determining that the first level is equal to a second predetermined value and writing the trace buffer to the log, otherwise determining that the first level does not exceed a third predetermined value and continuing to trace at the first level, otherwise writing the trace buffer to the log.

In yet another embodiment of the present invention there is provided a signal bearing medium having a computer readable signal tangibly embodying computer readable program code for instructing a computer to perform a method for automatic collection of trace detail and history data of program activity in a computer system. The method comprises the following steps: tracing program activity at a first level to produce the trace detail data, writing the trace detail data to a trace buffer, determining that the first level does not exceed a first predetermined value, continuing to trace at the first level, otherwise writing the trace buffer to a log; and determining that the first level is equal to a second predetermined value, writing the trace buffer to the log, otherwise determining that the first level does not exceed a third predetermined value, continuing to trace at the first level, otherwise writing the trace buffer to the log.

In yet another embodiment of the present invention there is provided a signal bearing medium having a computer readable signal tangibly embodying computer readable program code for instructing a computer to provide the means of a computer system for automatic collection of trace detail and history data of program activity in the computer system. The computer system comprises means for tracing program activity at a first level to produce the trace detail data, and means for writing the trace detail data to a trace buffer; and means for determining that the first level does not exceed a first predetermined value and continuing to trace at the first level, otherwise writing the trace buffer to a log; and means for determining that the first level is equal to a second predetermined value and writing the trace buffer to the log, otherwise determining that the first level does not exceed a third predetermined value and continuing to trace at the first level, otherwise writing the trace buffer to the log.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
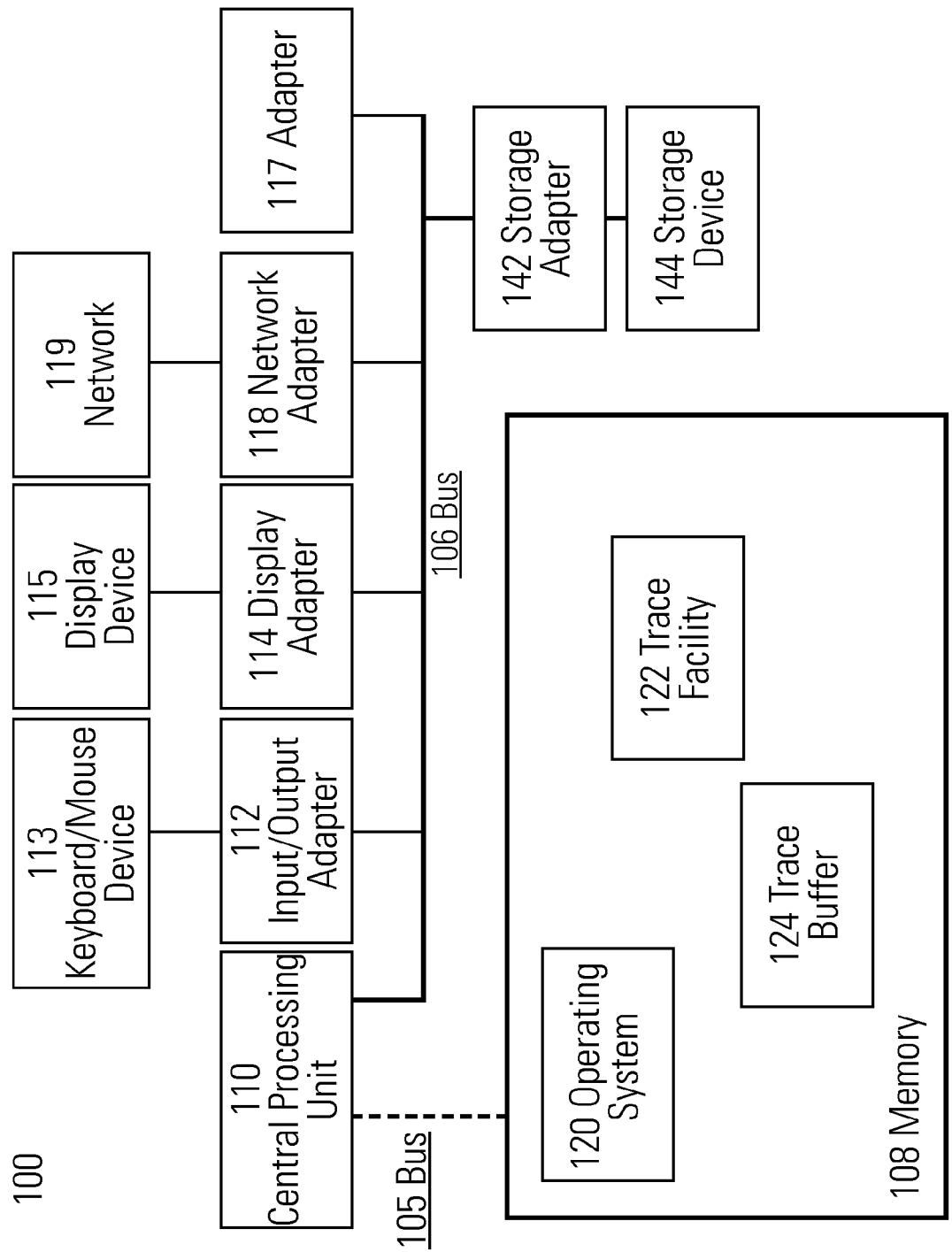
FIG. 1 is a hardware overview of a computer system, in support of an embodiment of the present invention.

FIG. 1 depicts, in a simplified block diagram, a computer system 100 suitable for implementing embodiments of the present system. Computer system 100 has central processing unit 110 (also referenced herein as CPU 110), which is a programmable processor for executing programmed instructions stored in memory 108. Memory 108 can also comprise hard disk, tape or other storage media. While a single CPU 110 is depicted in FIG. 1, it is understood that other forms of computer systems can be used to implement the present system. It is also appreciated that the present system can be implemented in a distributed computing environment having a plurality of computers communicating via a suitable network 119.

CPU 110 is connected to memory 108 either through a dedicated system bus 105 and/or a general system bus 106. Memory 108 can be a random access semiconductor memory for storing application data for processing such as that in a database partition. Memory 108 is depicted conceptually as a single monolithic entity but it is well known that memory 108 can be arranged in a hierarchy of caches and other memory devices. FIG. 1 illustrates that operating system 120 may reside in memory 108 as well as trace facility 122 and trace buffer 124 (also referenced herein as trace history buffer 124). Trace buffer 124 is a segment of memory 108 used by trace facility 122 for capturing trace data for a running program. The trace buffer 124 is configurable with regard to size (number of trace records). It may also be known as a circular buffer due to the nature in which new records overwrite old records after the buffer space has been filled. New data wraps around and replaces old data in a cyclical manner.

Operating system 120 provides functions such as device interfaces, memory management, multiple task management, and the like as known in the art. CPU 110 can be suitably programmed to read, load, and execute instructions of operating system 120. Computer system 100 has the necessary subsystems and functional components to implement selective program tracing functions such as gathering trace records and historical data as will be discussed later. Other programs (not shown) comprise server software applications in which network adapter 118 interacts with the server software application to enable computer system 100 to function as a network server via network 119.

General system bus 106 supports transfer of data, commands, and other information between various subsystems of computer system 100. While shown in simplified form as a single bus, bus 106 can be structured as multiple buses arranged in hierarchical form. Display adapter 114 supports video display device 115, which is a cathode-ray tube display or a display based upon other suitable display technology. The Input/output adapter 112 supports devices suited for input and output, such as keyboard/mouse device 113, and a disk drive unit (not shown). Storage adapter 142 supports one or more data storage devices 144, which could comprise a magnetic hard disk drive or CD-ROM, although other types of data storage devices can be used, including removable media.

Adapter 117 is used for operationally connecting many types of peripheral computing devices to computer system 100 via bus 106, such as printers, bus adapters, and other computers using one or more protocols including Token Ring, LAN connections, etc. as known in the art. Network adapter 118 provides a physical interface to a suitable network 119, such as the Internet. Network adapter 118 comprises a modem that can be connected to a telephone line for accessing network 119. Computer system 100 can be connected to another network server via a local area network using an appropriate network protocol and the network server that can in turn be connected to the Internet. FIG. 1 is intended as an exemplary representation of computer system 100 by which embodiments of the present invention can be implemented. It is understood that in other computer systems, many variations in system configuration are possible in addition to those mentioned here.

Figure 2:
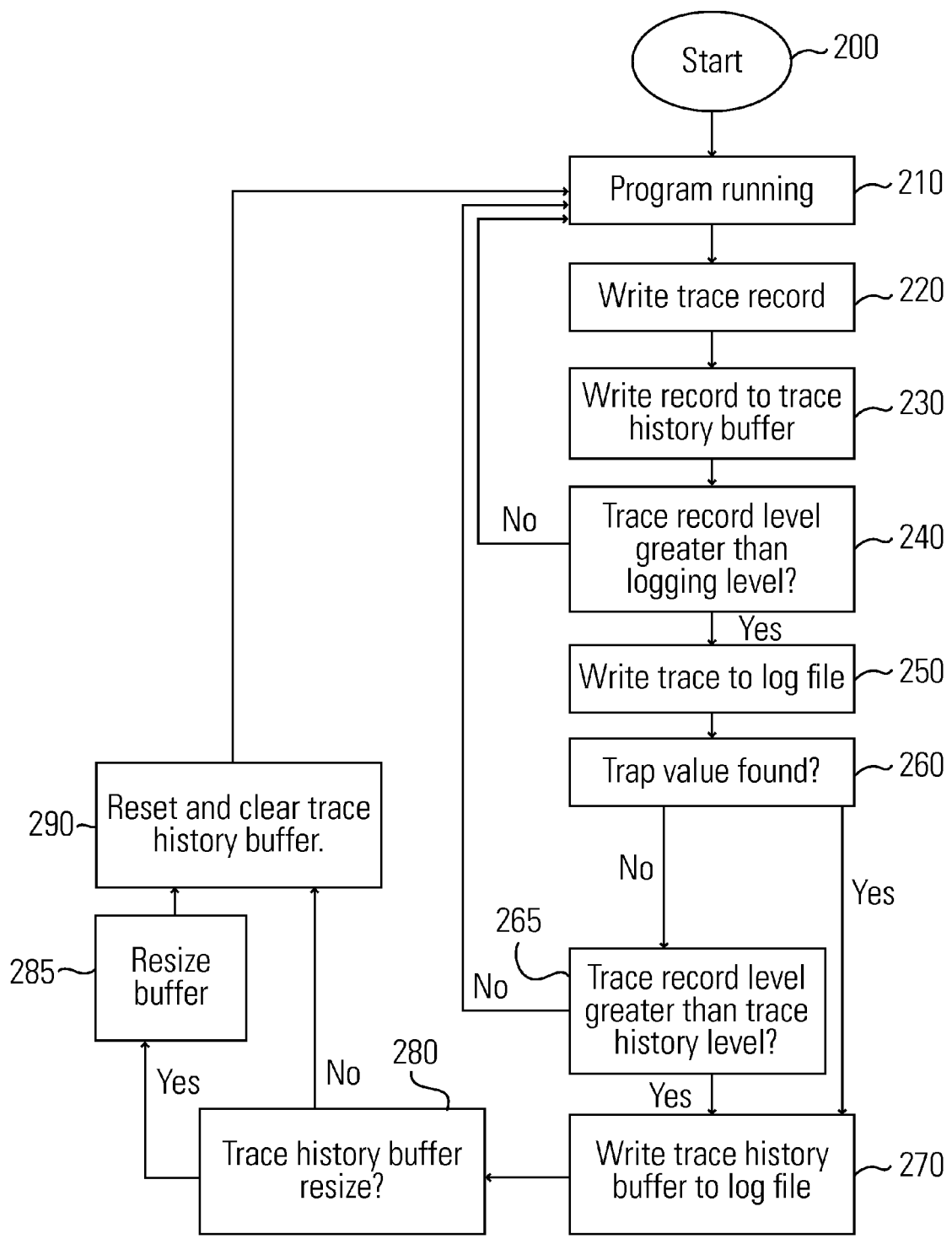
FIG. 2 is a process flow diagram of activities performed in an embodiment of the present invention operating in an environment as shown in FIG. 1.

FIG. 2 is a process flow chart describing the steps in the process of an embodiment of the present system that begins with operation 200 wherein all normal setup activity required to run a program and initialize trace facility 122 of FIG. 1 has been performed.

During operation 210, a program is set into execution mode as would be normal and processing moves to operation 220 wherein tracing of the program is initiated. As trace data is collected during operation 220, the collection reaches a predetermined point where the data is written out as a trace record into a trace history buffer 124 during operation 230. Trace buffer 124 is typically contained in more volatile storage or memory of the system such as memory 108 of FIG. 1. During normal activity, trace records fill the trace buffer 124 and overwrite older records causing trace buffer 124 of FIG. 1 to be viewed as a circular buffer. It is circular in the sense that upon filling the buffer, the oldest records are overwritten by newer records in a cyclical manner.

Each of the trace records has a trace level associated with it such as 'fatal', 'warning', or 'info' or it may be in numeric form such as '1', '2', and '3' or alphanumeric. The number of levels of trace is dependent upon the level of granularity of control desired. The trace levels range between a high and low severity based on impact within the running program.

The tracing facility has a configurable overall logging level that is used to determine if a trace record is to be written to a log file (typically persistent storage such as that of storage device 144 of FIG. 1). For example if a trace record is deemed to be at a high enough level, such as 'Fatal', the record may be written out to the log file.

The trace record written during operation 230 is then examined during operation 240 to determine if it exceeds an established threshold value. When the trace record level exceeds the threshold, the trace record is written to a persistent log file during operation 250. Otherwise processing reverts to operation 210 wherein tracing of the running program is performed as before.

The trace facility 122 also has a configurable history level that is used to determine at what level of severity the content of the trace buffer 124 is caused to be written to the log file. Typically this level would be set low such as that of 'Info' so as to capture any history data related to an error condition.

Having written a trace record in operation 250, processing moves to operation 260 during which a determination is made regarding existence of a specific trap value. A trap value is a specified value used as a trigger or signal to initiate logging of history data for a specific program activity. Such a trap value may be a condition code unique to a program event or process of interest or other suitable programmable indicator. A trap value may be a single value or a multiple of such values, anyone of which would become a trigger value. The trap value is more specific than other trace values that are more suited to classes of program activity. If a trap value has been specified as the target of a trace and that value is encountered in a trace, processing moves to perform the actions of operation 270 wherein the content of trace buffer 124 (history data) is written to the log file during operation 270. Otherwise the level of that trace record is compared to a history trace threshold value during operation 265. If it is determined that the trace record level exceeds the level of the history trace threshold, processing moves to perform the actions of operation 270 just stated. Otherwise processing reverts to operation 210 wherein tracing of the running program is performed as before.

Having written the content of trace buffer 124 (history data) to the log file during operation 270 processing moves to operation 280 during which it is determined if trace buffer 124 is in need of resizing. If a resizing requirement is determined during operation 280, processing moves to operation 285 where the necessary storage is allocated. Processing then moves to operation 290 during which trace buffer 124 is reset and cleared. If during operation 280 it was determined that no resizing of trace buffer 124 was required processing would move directly to operation 290 during which trace buffer 124 is reset and cleared. Processing then reverts to operation 210 wherein tracing of the running program is performed as before and the steps are repeated as needed.

During normal operation when the logging or tracing facility is set to a first level (less than maximum), the highest level of trace detail active at that time is recorded to trace buffer 124. The number of log or trace records stored in trace buffer 124 may be configured based on size of memory allocation available or perhaps number of records desired. When trace facility 122 detects an error and logging or tracing has not been set to a second level (the maximum) then the facility may automatically write the contents of trace buffer 124 to a log.

The data written to the log provides another level of detail and prior program history needed to diagnose a problem without having to raise the log level and recreate the problem. Tracing can be kept at a low level until more detailed information is required at which time tracing is then automatically set to a higher level.

Variations of providing a trigger value to the tracing facility could come in various forms. The trigger could come from a hardware signal, such as an interrupt or a state machine programmed to monitor trace records to determine heuristically if an event has occurred a specified number of times in absolute terms or occurred a number of times within a specified time interval.

The history buffer can be any means providing a capability to store trace data records for future use while having control over the amount or size of storage space consumed. For example if an error is found to be occurring frequently, the trace facility 122 could provide a form of expanded or secondary allocation of storage to capture more data as required. This secondary allocation can also be controlled through known means to avoid total exhaustion of memory 108.

It is to be understood that the specific embodiments of the invention that have been described are merely illustrative of certain application of the principle of the present invention. Numerous modifications may be made to the system and method for automatically collecting trace detail and history data invention described herein without departing from the spirit and scope of the present invention.

What is claimed is:

1. A computer program product comprising a computer useable storage medium having a computer readable program, wherein the computer readable program when executed on a computer causes the computer to:
   monitor program activity occurring during execution of a computer program;
   collect trace data representative of the program activity;
   write, after the collecting the trace data reaches a predetermined point, the trace data to one or more trace records in a trace history buffer located in a volatile memory, each of the one or more trace records including a trace level associated therewith, the trace level indicating a severity of the program activity, the trace history buffer being a circular buffer such that oldest trace records are overwritten by newest trace records in a cyclical manner if the trace history buffer becomes full;
   compare, for each trace record stored in the trace history buffer, the trace level to a predetermined threshold value, and writing the trace record to a log file located in persistent storage as a logged trace record if the trace level is greater than the predetermined threshold value;
   write each remaining trace record stored in the trace history buffer to the log file if (i) at least one of the trace records is written to the log file as the logged trace record and (ii) a trap value specific to a process from a plurality of processes in the program activity is detected within the logged trace record;
   write the trace history buffer to the log file if the trap value specific to the program activity fails to be detected, and if the trace level associated with the logged trace record is subsequently determined to be greater than a predetermined trace history level;
   upon writing the trace history buffer to the log file, resize the trace history buffer if a quantity of the one or more trace records in the trace history buffer exceeds a predetermined number of trace records; and
   reset and clear the trace history buffer such that storing of trace records may continue.

2. The computer program product of claim 1, wherein the trace level is a numeric value.

3. The computer program product of claim 1, wherein the trace history buffer is of a configurable size.

4. The computer program product of claim 1, wherein the predetermined threshold value is configurable.

5. The computer program product of claim 1, wherein the predetermined trace history level is configurable.

6. The computer program product of claim 1, wherein the predetermined trace history level indicates a level of severity that causes the trace history buffer to be written to the log file.

7. The computer program product of claim 1, wherein the trap value comprises a condition code unique to an event occurring within the program.

8. The computer program product of claim 1, wherein the trap value comprises a trigger received from a hardware signal.

9. The computer program product of claim 1, wherein resizing the trace history buffer further comprises clearing the trace history buffer.

10. The computer program product of claim 1, wherein resizing the log file and the trace history buffer reside on different computer systems that communicate over a network.

11. A system having a processor comprising:
a monitoring module that monitors program activity occurring during execution of a computer program;
a trace data collection module that collects trace data representative of the program activity;
a write module that writes, after the collecting the trace data reaches a predetermined point, the trace data to one or more trace records in a trace history buffer located in a volatile memory, each of the one or more trace records including a trace level associated therewith, the trace level indicating a severity of the program activity, the trace history buffer being a circular buffer such that oldest trace records are overwritten by newest trace records in a cyclical manner if the trace history buffer becomes full;
a comparison module that compares, for each trace record stored in the trace history buffer, the trace level to a predetermined threshold value, and writing the trace record to a log file located in persistent storage as a logged trace record if the trace level is greater than the predetermined threshold value;
a remaining trace record write module that writes each remaining trace record stored in the trace history buffer to the log file if (i) at least one of the trace records is written to the log file as the logged trace record and (ii) a trap value specific to a process from a plurality of processes in the program activity is detected within the logged trace record;
a trace history buffer write module that writes the trace history buffer to the log file if the trap value specific to the program activity fails to be detected, and if the trace level associated with the logged trace record is subsequently determined to be greater than a predetermined trace history level;
a resize module that, upon writing the trace history buffer to the log file, resizes the trace history buffer if a quantity of the one or more trace records in the trace history buffer exceeds a predetermined number of trace records; and
a reset and clear module that resets and clears the trace history buffer such that storing of trace records may continue.

12. The system of claim 11, wherein the trace level is a numeric value.

13. The system of claim 11, wherein the trace history buffer is of a configurable size.

14. The system of claim 11, wherein the predetermined threshold value is configurable.

15. The system of claim 11, wherein the predetermined trace history level is configurable.

16. The system of claim 11, wherein the predetermined trace history level indicates a level of severity that causes the trace history buffer to be written to the log file.

17. The system of claim 11, wherein the trap value comprises a condition code unique to an event occurring within the program.

18. The system of claim 11, wherein the trap value comprises a trigger received from a hardware signal.

19. The system of claim 11, wherein resizing the trace history buffer further comprises clearing the trace history buffer.

20. The system of claim 11, wherein resizing the log file and the trace history buffer reside on different computer systems that communicate over a network.

* * * * *